(12) United States Patent
Zubow et al.

(10) Patent No.: US 9,338,686 B2
(45) Date of Patent: May 10, 2016

(54) METHOD FOR OPERATING A WIRELESS NETWORK, A WIRELESS NETWORK AND A DEVICE

(75) Inventors: Anatolij Zubow, Berlin, DE (US);
Johannes Marotzke, Berlin (DE);
Daniel Camps Mur, Darmstadt (DE);
Xavier Perez Costa, Heidelberg (DE)

(73) Assignee: NEC EUROPE LTD., Heidelberg (DE)

( * ) Notice: Subject to any disclaimer, the term of this patent is extended or adjusted under 35 U.S.C. 154(b) by 174 days.

(21) Appl. No.: 14/006,760

(22) PCT Filed: Jan. 13, 2012

(86) PCT No.: PCT/EP2012/050523
§ 371 (c)(1),
(2), (4) Date: Sep. 23, 2013

(87) PCT Pub. No.: WO2013/104428
PCT Pub. Date: Jul. 18, 2013

(65) Prior Publication Data
US 2014/0010080 A1    Jan. 9, 2014

(51) Int. Cl.
*H04W 4/00*   (2009.01)
*H04W 28/02*  (2009.01)
*H04B 7/04*   (2006.01)
*H04W 4/08*   (2009.01)
*H04L 1/00*   (2006.01)

(52) U.S. Cl.
CPC ......... *H04W 28/0236* (2013.01); *H04B 7/0417* (2013.01); *H04B 7/0452* (2013.01); *H04W 4/08* (2013.01); *H04L 1/0015* (2013.01)

(58) Field of Classification Search
CPC .. H04B 7/0417; H04B 7/0452; H04B 7/0456; H04B 7/0626; H04W 4/08; H04W 8/186; H04W 28/0236; H04L 1/0015
USPC ............... 370/252, 312, 328, 334, 338
See application file for complete search history.

(56) References Cited

U.S. PATENT DOCUMENTS 8,040,278 B2 * 10/2011 Maltsev et al. ............... 342/378
2007/0223423 A1 * 9/2007 Kim et al. ..................... 370/334

(Continued)

OTHER PUBLICATIONS

SINR Degradation in MIMO-OFDM Systems with Channel Estimation Errors and Partial Phase Noise Compensation, IEEE, Aug. 8, 2010.*
"Adaptive MIMO Transmission for Exploiting the Capacity of Spatially Correlated Channels", IEEE, Mar. 2, 2007.*
International Search Report dated Sep. 3, 2012, corresponding to PCT/EP2012/050523.

(Continued)

*Primary Examiner* — Kwang B Yao
*Assistant Examiner* — Harun Chowdhury
(74) *Attorney, Agent, or Firm* — Young & Thompson (57) ABSTRACT

Method for operating a wireless network, wherein at least one MIMO (Multiple Input Multiple Output) group of different stations will be constructed by a grouping algorithm based on a grouping metric for providing a MIMO group of different stations addressable simultaneously in space by a base station using MIMO techniques and meeting a definable level of performance quality, the grouping metric being based on an SINR (Signal-to-Interference and Noise Ratio) experienced by each station within the MIMO group. The method includes: computing an SNR (Signal-to-Noise Ratio) that a new station would experience without any interference when added to an existing MIMO group; computing an SINR estimate by correcting the SNR with the sum of spatial correlations between the new and each of the stations already present in the existing MIMO group; and using the SINR estimate for deciding whether the new station can be added to the existing MIMO group.

15 Claims, 6 Drawing Sheets

SINR Estimation from Precoding

SINR Predictor

◄─► Considered spatial correlation (56) References Cited

U.S. PATENT DOCUMENTS

| | | | |
|---|---|---|---|
| 2008/0165883 A1* | 7/2008 | Jiang et al. | 375/267 |
| 2009/0219856 A1* | 9/2009 | Richardson et al. | 370/328 |
| 2009/0322621 A1* | 12/2009 | Inanoglu et al. | 343/702 |
| 2011/0269392 A1* | 11/2011 | Jen et al. | 455/3.01 |
| 2011/0274003 A1* | 11/2011 | Pare et al. | 370/252 |
| 2012/0230264 A1* | 9/2012 | Zhang et al. | 370/329 |

OTHER PUBLICATIONS

T. Ohgane, et al.; "A Study on a Channel allocation scheme with an adaptive array in SDMA"; Vehicular Technology Conference, 1997, vol. 2; May 4, 1997; pp. 725-729.

Shad Faisal. et al.; "Dynamic Slot Allocation (DSA) in Indoor SDMA/TDMA Using a Smart Antenna Basestation"; vol. 9; Feb. 1, 2001; pp. 74-76.

\* cited by examiner

METHOD FOR OPERATING A WIRELESS NETWORK, A WIRELESS NETWORK AND A DEVICE

The present invention relates to a method for operating a wireless network, wherein at least one MIMO (Multiple Input Multiple Output) group of different stations will be constructed by means of a grouping algorithm based on a grouping metric for providing a MIMO group of different stations which can be addressed simultaneously in space by a base station using MIMO techniques and meeting a definable level of performance quality and wherein the grouping metric is based on an SINR (Signal-to-Interference and Noise Ratio) experienced by each station within the MIMO group. Further, the present invention relates to an according wireless network and device.

BACKGROUND OF THE INVENTION

Methods for operating a wireless network and according networks and devices of the above mentioned type are known from the state of the art. Such methods, networks and devices can use known MIMO techniques.

It is well accepted in the industry and academia that novel wireless techniques are required to cope with the exponential increase in data traffic forecasted for the upcoming years.

Figure 1:
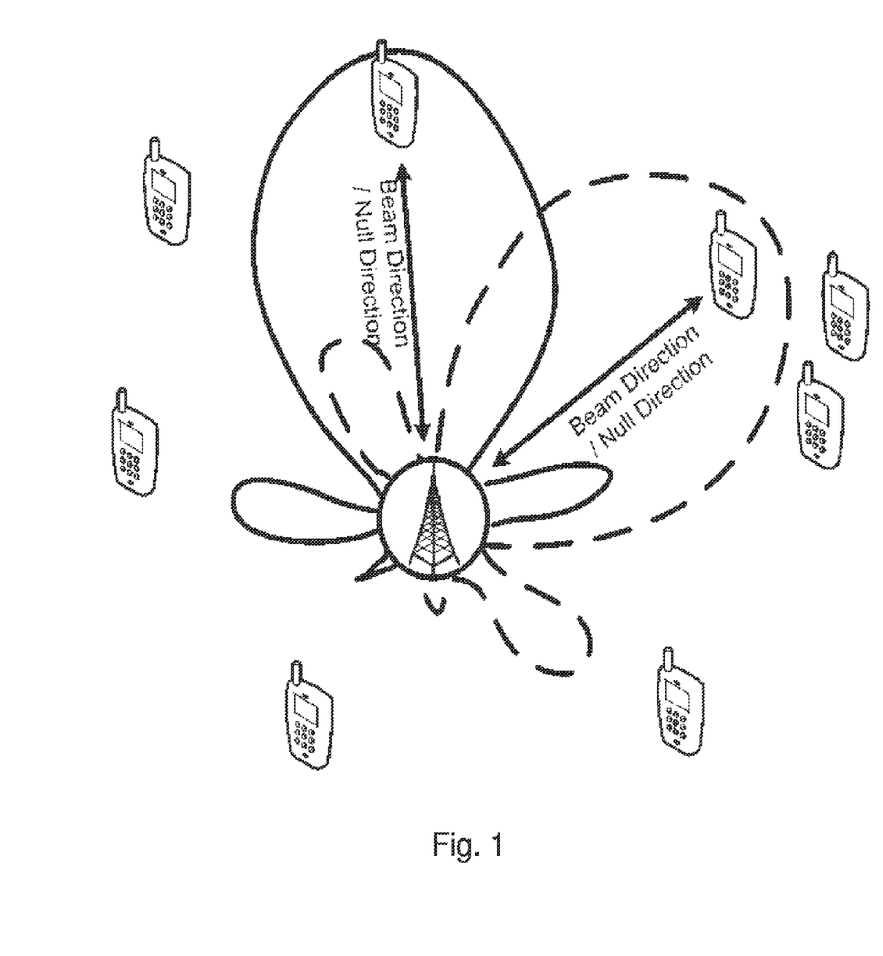
FIG. 1 is illustrating steering different spatial beams towards intended mobile stations.

As an example of known MIMO techniques SDMA (Space Division Multiple Access) will be explained in the following for stating the present situation of network technology in this regard. SDMA is a novel physical layer technique that can be used for the purpose of increasing capacity, and will be widely adopted by 4G wireless technologies. SDMA requires deploying several antennas at the Base Station (BS), in order to allow the BS to transmit simultaneously to different stations. The previous is achieved by steering different spatial beams towards the intended receivers as depicted in FIG. 1. Particularly, transmission schemes based on Orthogonal Frequency Division Multiple Access (OFDMA) combined with SDMA techniques are key promising technologies to increase current spectral efficiencies.

When using SDMA, a BS needs an algorithm that decides which stations can be multiplexed in space. For instance, if two stations are very close to each other or their channels are highly correlated, then it is impossible for the BS to construct beams to transmit simultaneously to both stations using the same time/frequency resources. In order to decide which subsets of stations can be addressed simultaneously using SDMA, a BS requires an SDMA grouping algorithm.

An SDMA grouping algorithm can be seen as operating in the following way, see T. F. Maciel, Suboptimal resource allocation for multi-user mimo-ofdma systems, Ph.D. dissertation, Technical University of Darmstadt:
1—Select a set of stations to form a candidate SDMA group.
2—Evaluate how good this group is. For the purpose of evaluating a candidate group one requires a grouping metric.
3—From all the evaluated groups select the one that maximizes the chosen grouping metric.

Therefore a key parameter to have well performing SDMA grouping algorithms is to have a good grouping metric, i.e. a metric that can reliably capture the interference conditions in the group. Ideally, the best grouping metrics are the ones that predict the SINR of each station in the SDMA group, see T. F. Maciel, Suboptimal resource allocation for multi-user mimo-ofdma systems, Ph.D. dissertation, Technical University of Darmstadt. Such metrics are able to identify if a pair or set of stations will heavily interfere with each other when in the same SDMA group, and should therefore be allocated to different groups.

The current problem in the state of the art that this invention addresses is the fact that computing grouping metrics based on the SINR experienced by each station within an SDMA group is computationally very expensive. The reason being that these metrics require computing for each candidate SDMA group, the actual beamforming weights that the BS will use to transmit to the SDMA group. The following formula is a typical way to compute these beamforming weights, e.g. Minimum Mean Square Error technique, see F. Gross, Smart antennas for wireless communications with MATLAB, Professional engineering, McGraw-Hill, 2005:

$$W_b = (R_{ss} + R_{nn})^{-1} H_b,$$

where the previous are matrixes and vectors with dimensions that depend on the number of antennas in the BS. Notice that these are expensive operations, e.g. for M antennas in the BS the previous formula requires $O(M^3)$ arithmetic operations. Moreover, in a wideband system, like WiMAX or LTE (Long Term Evolution), the channel becomes frequency selective, and therefore the previous computation has to be done per frequency resource block b. Therefore, computing $W_b$ for each candidate SDMA group turns out to be very expensive.

SUMMARY OF THE INVENTION

It is an object of the present invention to improve and further develop a method for operating a wireless network, an according network and device for allowing a high level of performance quality within a network while reducing computational method complexity.

In accordance with the invention, the aforementioned object is accomplished by a method, by a network, and by a device.

According to the invention, a method is characterized by the steps: computing an SNR (Signal-to-Noise Ratio) that a new station would experience without any interference when added to an already existing MIMO group; computing an SINR estimate by correcting the SNR with the sum of the spatial correlations between the new station and each of the stations already present in the existing MIMO group; and using the SINR estimate for deciding whether the new station can be added to the existing MIMO group meeting the level of performance quality.

Further according to the invention, a network is characterized by means for computing an SNR (Signal-to-Noise Ratio) that a new station would experience without any interference when added to an already existing MIMO group; means for computing an SINR estimate by correcting the SNR with the sum of the spatial correlations between the new station and each of the stations already present in the existing MIMO group; and means for using the SINR estimate for deciding whether the new station can be added to the existing MIMO group meeting the level of performance quality.

Yet further according to the invention, a device, preferably a base station, is characterized by means for computing an SNR (Signal-to-Noise Ratio) that a new station would experience without any interference when added to an already existing MIMO group; means for computing an SINR estimate by correcting the SNR with the sum of the spatial correlations between the new station and each of the stations already present in the existing MIMO group; and means for using the SINR estimate for deciding whether the new station can be added to the existing MIMO group meeting the level of performance quality.

According to the invention it has been recognized that it is possible to reduce computational complexity by an estimation of the SINR or by means for using an estimation of the SINR experienced by each station in a MIMO group. The inventive method allows the usage of high quality MIMO grouping metric, while at the same time avoiding expensive operations. Particularly, the method according to the invention is a heuristic method to estimate the SINR of each station in a MIMO group, while avoiding having to compute expensive beamforming weights. The invention relies in the inventive recognition that in general direct spatial correlations between stations are more relevant for SINR estimations than indirect ones. The inventive method obtains SINR estimates for stations for MIMO grouping purposes that do not require considering all possible interference sources, while achieving a performance close to the one of the best methods available in the state of the art, but requiring a much lower computational complexity.

Within a preferred embodiment the MIMO group could be an SDMA group. Within further preferred embodiments the MIMO group could be an SU-MIMO (Single User MIMO) or MU-MIMO (Multiuser MIMO) group. In all cases the proposed and inventive method could be used to estimate the SINR of the data streams within the respective MIMO system.

Within a further preferred embodiment the SNR is an $SNR_{Bf}$ ($SNR_{Beamforming}$) obtained by computing the corresponding beamforming weights. Notice that computing these beamforming weights, $SNR_{Bf}$ is simpler than computing the weights required for SDMA, i.e. $W_b$.

With regard to a very effective and simple computational process the step of correcting the SNR could comprise $$\text{SINR} = SNR_{Bf} * \begin{cases} 1 - X, & \text{if } X < 1 \\ A, & \text{if } X > 1, \end{cases}$$

where $X = \Sigma |\tau_{ij}|^2$ is the sum of the spatial correlations between the new station and each of the stations in the MIMO group and A is a constant value that can be derived by simulations for generic use cases. Therefore, intuitively if there is a high spatial correlation between the new station or new stations and the other stations in the group then X will be high and the estimated SINR will be small, with the result that grouping is not recommended. Notice that it is known from the state of the art, that the spatial correlation between stations i and j can be computed by a simple scalar product between the stations' spatial channel vectors, i.e. hi and hj. These channel vectors are known in the Base Station of any modern wireless technologies, e.g. LTE or WiMAX.

Within a further preferred embodiment computation of spatial correlations between each pair of stations will be performed once only and considered for evaluating different MIMO groups. The simplification by considering only the separate effect between a new station to be tested and each of the other stations in the existing MIMO group results in having to compute the spatial correlations between each pair of stations only once. These pre-computed values can be simply considered when evaluating different MIMO groups.

With regard to a very high level of performance quality the grouping algorithm could be a FFA (First Fit Algorithm), BFA (Best Fit Algorithm) or CBA (Cluster-Based grouping Algorithm).

Within a further preferred embodiment the base station could be the device which computes the SNR that the new station would have, preferably under single-user transmit beamforming.

Alternatively or additionally the base station could compute the sum of the spatial correlations between the new station and each of the other stations already present in the existing MIMO group. Alternatively or additionally the base station could compute the SINR estimate. In this regard the base station could be the device for carrying out the above mentioned method steps.

Further preferred, the SNR or $SNR_{Bf}$ could be computed for each station before a new station will be added to an existing group.

Regarding an effective computational process a matrix could be calculated, which is holding the pairwise squared spatial correlations.

Further with regard to a very effective computational process the partial sum of the spatial correlations could be updated when a new station joins a MIMO group.

The invention provides the following important aspects:
1) It reduces the computational complexity of methods existing in the state of the art while delivering a similar performance.
2) A reduced computational complexity enables multiple benefits, like: more time to obtain better solutions, e.g. better groups, or energy savings, or the use of cheaper hardware components for a given performance target.
3) The proposed invention is generic and can be applied to any wireless technology deploying MIMO (SDMA), e.g.: LTE-A, 802.16m, 802.11, etc.

An SDMA grouping metric, which is able to predict the SINR of a MS in a SDMA group with low computational complexity is the key factor to be able to use SDMA in wideband wireless systems based on OFDM(A), where one needs to compute different beamforming weights per frequency block thus resulting in a very high complexity.

BRIEF DESCRIPTION OF THE DRAWINGS

There are several ways to design and further develop the teaching of the present invention in an advantageous way. To this end it is to be referred to the patent claims and to the following explanation of preferred examples of embodiments of the invention, illustrated by the drawing on the other hand. In connection with the explanation of the preferred embodiments of the invention by the aid of the drawing, generally preferred embodiments and further developments of the teaching will be explained. In the drawings

DETAILED DESCRIPTION OF THE PREFERRED EMBODIMENTS

An embodiment of the inventive method is explained in the following. The method is a heuristic algorithm to estimate the SINR of each station in an SDMA group, for example, while avoiding having to compute expensive beamforming weights. The method example is comprising the following steps:

1—When a grouping algorithm wants to evaluate the effect of adding a new station to a candidate SDMA group, the first thing that is done is to compute the SNR that the new station would experience without any interference. We refer to this SNR as $SNR_{Bf}$, and can be obtained using techniques available in the state of the art, e.g. computing the corresponding beamforming weights when using transmit beamforming as: $W_{Bf} = H^H/|H|^2$ 2—After the previous "optimistic" SNR is computed, the proposed method computes its final SINR estimate by correcting $SNR_{Bf}$ with the sum spatial correlation between the new station and each of the stations already present in the SDMA group. In particular the following is done:

$$SINR = SNR_{Bf} * \begin{cases} 1-X, \text{ if } X < 1 \\ A, \text{ if } X > 1, \end{cases}$$

where $\tau_{ij}$ represents the spatial correlation between MS i and j and is given by the maximum normalized scalar product (see D. B. Calvo, Fairness analysis of wireless beamforming schedulers, Ph.D. thesis, Technical University of Catalonia, Spain (2004) and I. Frigyes, J. Bito, P. Bakki (Eds.), Advances in Mobile and Wireless Communications: Views of the 16th IST Mobile and Wireless Communication Summit (Lecture Notes in Electrical Engineering), 1st Edition, Springer, 2008. $X = \Sigma |\tau_{ij}|^2$ is the sum of the spatial correlations between the new station and each of the stations in the SDMA group, and A is a constant value that can be derived by simulations for generic use cases. Therefore, intuitively if there is a high spatial correlation between the new station or new stations and the other stations in the group then X will be high and the estimated SINR will be small (grouping not recommended).

Figure 2:
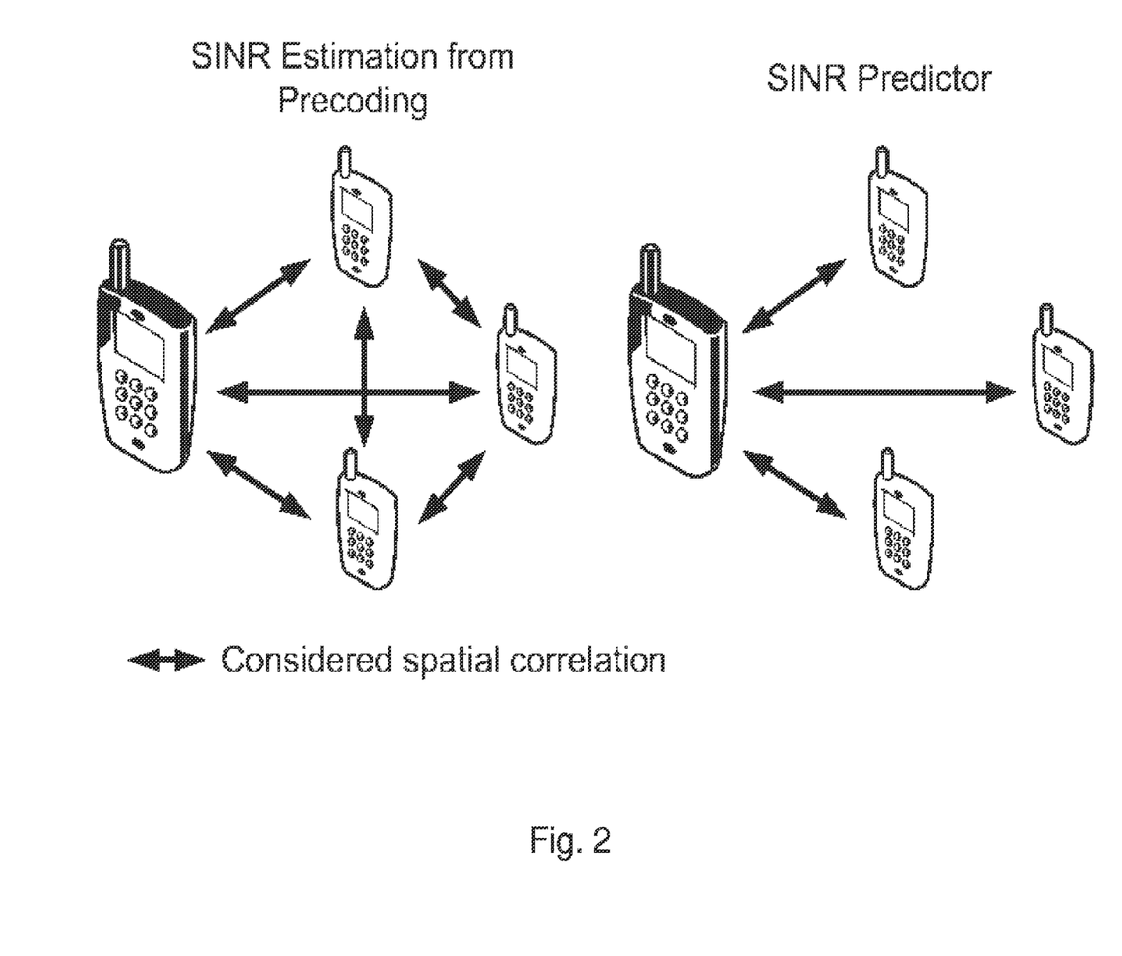
FIG. 2 is illustrating two methods for calculating the SINR of a user.

Without delving into the technical proofs showing how the previous operations are less expensive than computing the actual SDMA beamforming weights, one can realize that the reduced complexity of the proposed method comes from these two factors:

1—When computing the exact SDMA beamforming weights you are considering the effect, or interference, of each station in the SDMA over each other station in the SDMA group. However, the inventive method simplifies this by considering only the separate effect between a new station to be tested and each of the other stations in the SDMA group. This can be understood with FIG. 2.

2—The second source of complexity gain also comes from our proposed station spatial correlation simplification which results in having to compute the spatial correlations between each pair of stations only once, see $|\tau_{ij}|^2$, and then simply consider the pre-computed values when evaluating different SDMA groups.

Next, we show an evaluation of the performance of the inventive method compared to a method that computes the exact SDMA beamforming weights when evaluating each candidate SDMA group. The key is to look at the trade-off between network performance and required computational complexity.

Figure 3:
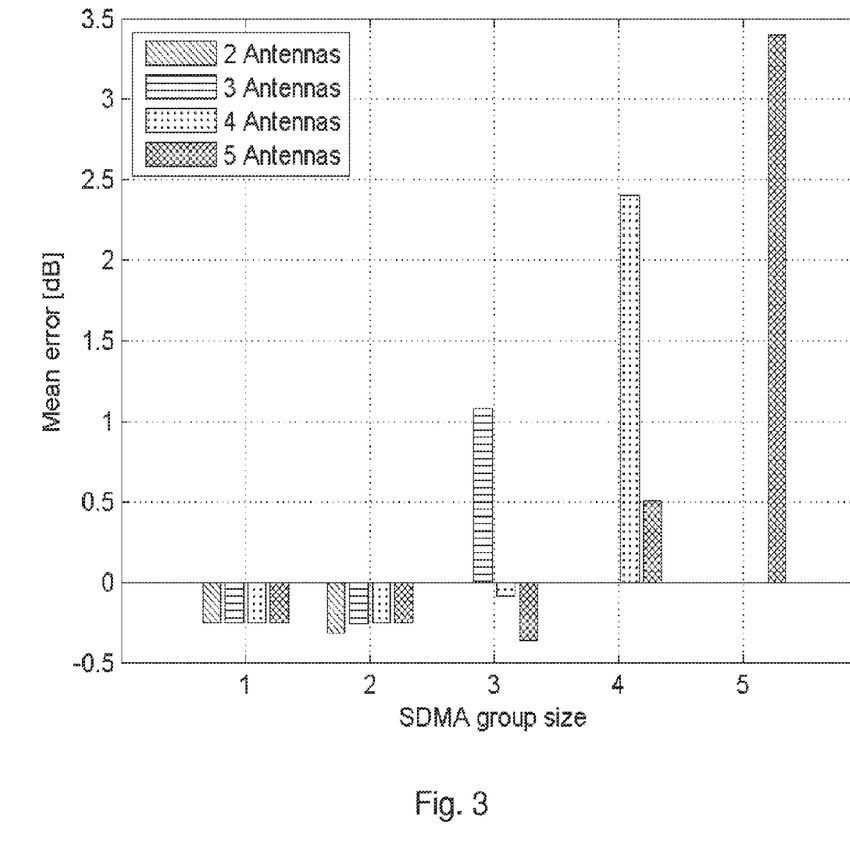
FIG. 3 is illustrating within a diagram the mean error of the predicted SINR using the proposed invention (SINR Predictor) versus real SINR (SINR Precoding) (OFDM subcarrier)

The graph in FIG. 3 illustrates the fact that our proposed method is not as precise as the exact method and, therefore, results in an estimation error of the SINR of each station in the SDMA group. In particular our method tends to be optimistic (estimate a higher SINR), specially as the group size is close to the number of antennas (M) in the BS.

Figure 4:
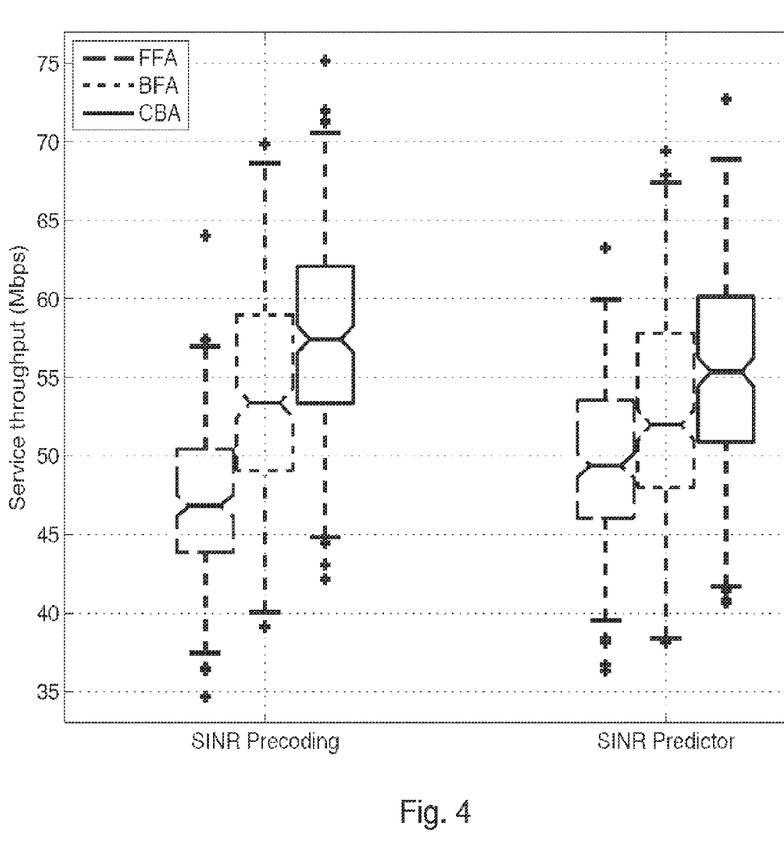
FIG. 4 is illustrating within a diagram the performance of the proposed SINR predictor in an OFDMA system compared to the one of a traditional SINR Precoding method.

However, the previous error does not significantly affect the achievable performance as we show next. FIG. 4 illustrates the average service throughput in a cell, achieved with three different grouping algorithms typically used in the state of the art, i.e. FFA, BFA (see T. F. Maciel, Suboptimal resource allocation for multi-user mimo-ofdma systems, Ph.D. dissertation, Technical University of Darmstadt) and CBA (see A. Zubow, J. Marotzke, D. C. Mur, X. P. Costa, Efficient QoS-aware WiMAX SDMA-OFDMA Scheduling Solution, in preparation), when these grouping algorithms use the exact beamforming computation method (SINR Precoding), and our proposed invention (SINR Predictor). As clearly observed in FIG. 4, the inventive method results in almost negligible performance differences for all considered grouping algorithms. To capture frequency selectivity the EESM (Exponential Effective SIR Mapping) method was used.

Figure 5:
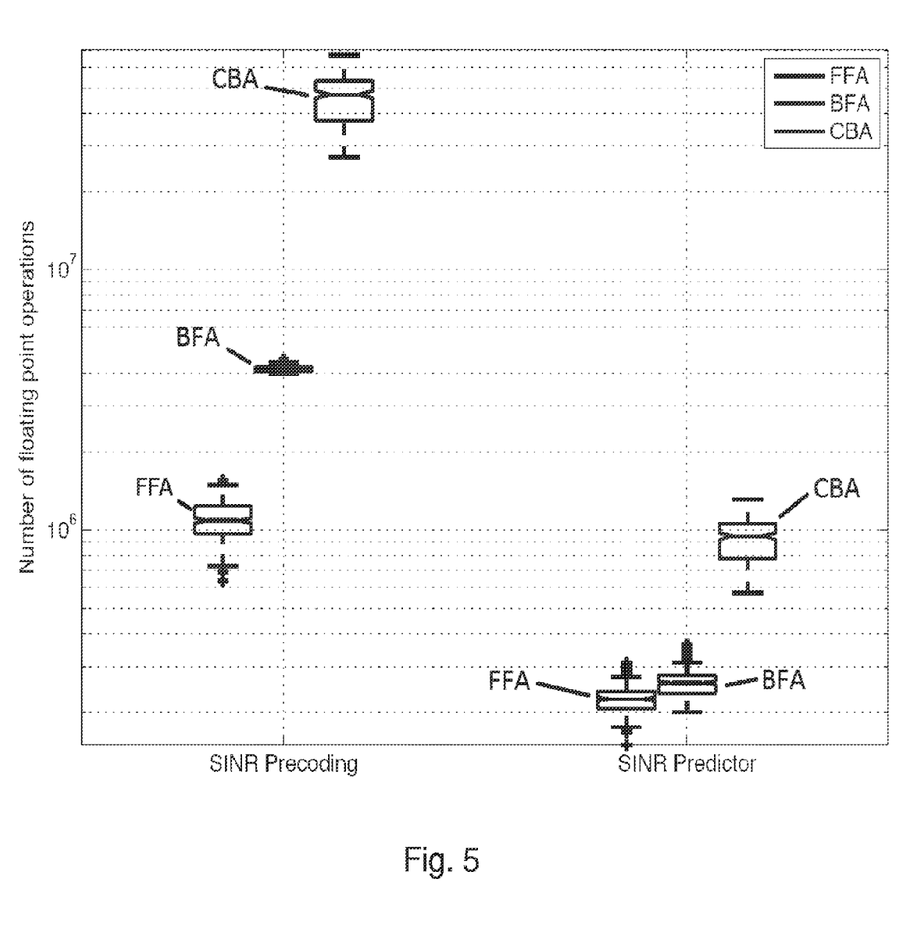
FIG. 5 is illustrating within a diagram the number of floating point operations in an OFDMA system required by the proposed SINR Predictor compared to the floating point operations required by a traditional SINR Precoding method and FIG. 6 is showing within a block diagram an example embodiment of a method for operating a network according to the proposed invention with an FFA grouping algorithm.

Finally, we look at the complexity of the previous grouping algorithms when using the exact beamforming method (SINR Precoding) or our proposed method (SINR Predictor). We evaluate complexity looking at the number of required floating point operations (FLOPs). As can be seen in FIG. 5, our proposed method reduces the number of required operations in at least one order of magnitude for all considered grouping algorithms.

Summarizing, the embodiment of the invention at hand can be described as follows: A low complexity method to estimate the SINR of individual stations in a MIMO system, like SDMA, characterized in that:

1—The BS computes the SNR that the tagged station would have under single-user transmit beamforming (Maximum Ratio Combining (see C. Oestges, B. Clerckx, MIMO Wireless Communications: From Real-World Propagation to Space-Time Code Design, Academic Press, Inc., Orlando, Fla., USA, 2007), $SNR_{Bf}$ (methods available in the state of the art can be used for this purpose).

2—The BS derives a factor X by computing the sum of the spatial correlations between the tagged station and each of the other stations in the SDMA group.

3—If X<1, then the BS selects I=1−X as the interference factor. If X>1 then the BS selects a constant pre-computed value I=A as the interference factor.

Figure 6:
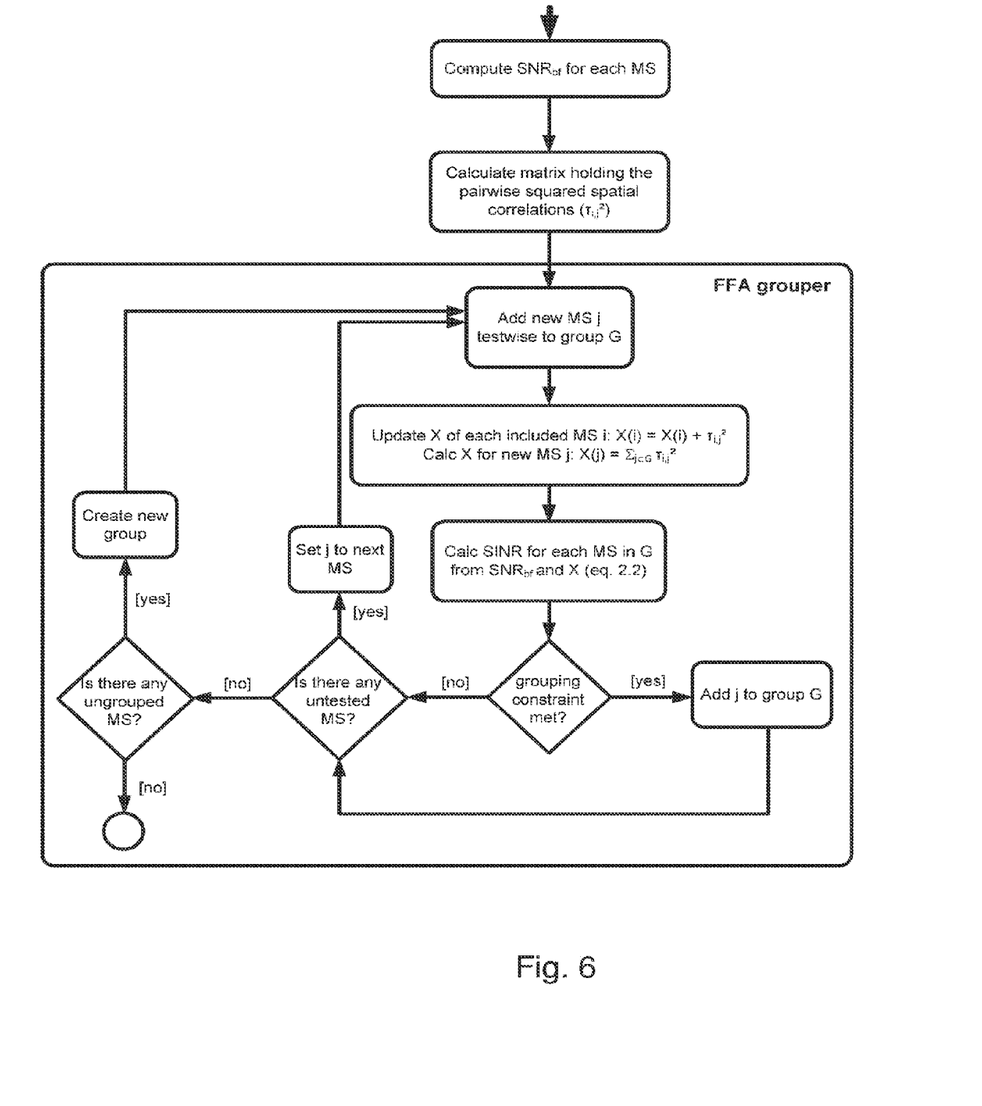

4—Finally, the BS estimates the SINR of the tagged MS by computing: $SINR = SNR_{Bf} \times I$ The diagram in FIG. 6 illustrates how the proposed method can be applied together with an FFA grouping algorithm.

SDMA has to be understood as an embodiment of the proposed invention. Therefore, the presented method could also be applied to other MIMO techniques, like SU-MIMO, where the proposed method could be used to estimate the SINR of the data streams within a single user MIMO system.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for operating a wireless network wherein at least one MIMO (Multiple Input Multiple Output) group of different stations will be constructed by means of a grouping algorithm based on a grouping metric for providing a MIMO group of different stations which can be addressed simultaneously in space by a base station using MIMO techniques and meeting a definable level of performance quality and wherein the grouping metric is based on an SINR (Signal-to-Interference and Noise Ratio) experienced by each station within the MIMO group, comprising the following steps:
  computing an SNR (Signal-to-Noise Ratio) that a new station would experience without any interference when added to an already existing MIMO group;
  computing an SINR estimate by correcting the SNR with the sum of the spatial correlations between the new station and each of the stations already present in the existing MIMO group; and
  using the SINR estimate for deciding whether the new station can be added to the existing MIMO group meeting the level of performance quality,
  wherein correcting the SNR comprises $$SINR = SNR_{Bf} * \begin{cases} 1-X, \text{ if } X < 1 \\ A, \text{ if } X > 1, \end{cases}$$

where $X = \Sigma |\tau_{ij}|^2$ is the sum of the spatial correlations between the new station and each of the stations in the MIMO group and A is a constant value that can be derived by simulations for generic use cases.

2. The method according to claim 1, wherein the MIMO group is an SDMA (Space Division Multiple Access) group.

3. The method according to claim 1, wherein the MIMO group is an SU-MIMO (Single User MIMO) or MU-MIMO (Multi User MIMO) group.

4. The method according to claim 1, wherein the SNR is an SNRBf (SNRBeamforming) obtained by computing the corresponding beamforming weights.

5. The method according to claim 1, wherein computation of spatial correlations between each pair of stations will be performed once only and considered for evaluating different MIMO groups.

6. The method according to claim 1, wherein the grouping algorithm is a FFA (First Fit Algorithm), BFA (Best Fit Algorithm) or CBA (Cluster-Based grouping Algorithm).

7. The method according to claim 1, wherein the base station computes the SNR that the new station would have.

8. The method according to claim 1, wherein the base station computes the sum of the spatial correlations between the new station and each of the other stations already present in the existing MIMO group.

9. The method according to claim 1, wherein the base station computes the SINR estimate.

10. The method according to claim 1, wherein SNR or SNRBf will be computed for each station.

11. The method according to claim 1, wherein a matrix will be calculated, which is holding the pairwise squared spatial correlations.

12. The method according to claim 1, wherein the partial sum of the spatial correlations will be updated when a new station joins a MIMO group.

13. A wireless network for carrying out the method according to claim 1, wherein at least one MIMO (Multiple Input Multiple Output) group of different stations will be constructed by means of a grouping algorithm based on a grouping metric for providing a MIMO group of different stations which can be addressed simultaneously in space by a base station using MIMO techniques and meeting a definable level of performance quality and wherein the grouping metric is based on an SINR (Signal-to-Interference and Noise Ratio) experienced by each station within the MIMO group, comprising:
  means for computing an SNR (Signal-to-Noise Ratio) that a new station would experience without any interference when added to an already existing MIMO group;
  means for computing an SINR estimate by correcting the SNR with the sum of the spatial correlations between the new station and each of the stations already present in the existing MIMO group; and
  means for using the SINR estimate for deciding whether the new station can be added to the existing MIMO group meeting the level of performance quality.

14. A device for carrying out the method according to claim 1, wherein at least one MIMO (Multiple Input Multiple Output) group of different stations will be constructed by means of a grouping algorithm based on a grouping metric for providing a MIMO group of different stations which can be addressed simultaneously in space by a base station using MIMO techniques and meeting a definable level of performance quality and wherein the grouping metric is based on an SINR (Signal-to-Interference and Noise Ratio) experienced by each station within the MIMO group, comprising:
  means for computing an SNR (Signal-to-Noise Ratio) that a new station would experience without any interference when added to an already existing MIMO group;
  means for computing an SINR estimate by correcting the SNR with the sum of the spatial correlations between the new station and each of the stations already present in the existing MIMO group; and
  means for using the SINR estimate for deciding whether the new station can be added to the existing MIMO group meeting the level of performance quality.

15. The method according to claim 7, wherein the base station computes the SNR that the new station would have under single-user transmit beamforming.

* * * * *